US007668775B2

(12) United States Patent
Lu

(10) Patent No.: US 7,668,775 B2
(45) Date of Patent: Feb. 23, 2010

(54) CALENDAR OVERLAYS

(75) Inventor: Larry L. Lu, Great Falls, VA (US)

(73) Assignee: AOL LLC, Dulles, VA (US)

(*) Notice: Subject to any disclaimer, the term of this patent is extended or adjusted under 35 U.S.C. 154(b) by 310 days.

(21) Appl. No.: 11/404,774

(22) Filed: Apr. 17, 2006

(65) Prior Publication Data

US 2006/0190313 A1 Aug. 24, 2006

Related U.S. Application Data

(63) Continuation of application No. 10/283,138, filed on Oct. 30, 2002, now Pat. No. 7,039,596.

(60) Provisional application No. 60/349,251, filed on Jan. 18, 2002.

(51) Int. Cl.
*G06Q 40/00* (2006.01)

(52) U.S. Cl. ........................................ 705/37; 705/39

(58) Field of Classification Search .................. 705/37, 705/39

See application file for complete search history.

(56) References Cited

U.S. PATENT DOCUMENTS

| | | | |
|---|---|---|---|
| 5,144,557 | A | 9/1992 | Wang et al. |
| 5,261,045 | A | 11/1993 | Scully et al. |
| 5,596,373 | A | 1/1997 | White et al. |
| 5,690,364 | A | 11/1997 | Oleske et al. |
| 5,860,067 | A | 1/1999 | Onda et al. |
| 5,899,979 | A | 5/1999 | Miller et al. |
| 5,907,829 | A | 5/1999 | Kida |
| 5,960,406 | A | 9/1999 | Rasansky et al. |
| 5,970,466 | A | 10/1999 | Detjen et al. |
| 6,018,343 | A | 1/2000 | Wang et al. |
| 6,064,977 | A | 5/2000 | Haverstock et al. |
| 6,085,235 | A | 7/2000 | Clarke, Jr. et al. |
| 6,167,379 | A | 12/2000 | Dean et al. |
| 6,369,840 | B1 | 4/2002 | Barnett et al. |
| 6,380,959 | B1 | 4/2002 | Wang et al. |

(Continued)

FOREIGN PATENT DOCUMENTS

| | | |
|---|---|---|
| WO | WO 99/58345 | 11/1999 |

OTHER PUBLICATIONS

"iCalShare", iCal information printed from http://www.icalshare.com/, 3 pages.

(Continued)

*Primary Examiner*—Daniel S Felten
(74) *Attorney, Agent, or Firm*—Fish & Richardson P.C.

(57) ABSTRACT

Implementing an electronic calendar can include accessing a first electronic calendar owned by a first party, accessing a second electronic calendar owned by a second party, and presenting a view that combines at least one existing entry from within each of the first and second electronic calendars. Source information for each of the first and second electronic calendars may be electronically maintained. The combined view may be updated electronically to reflect a change to at least one of the existing entries from within at least one of the first and second electronic calendars. Electronic calendars may be accessed and overlaid without importing events, thus enabling simple updating. Event information may be imported and source or other attributes may be associated with imported information to enable updating and other sorting functions.

56 Claims, 7 Drawing Sheets

U.S. PATENT DOCUMENTS

| | | | | |
|---|---|---|---|---|
| 6,675,356 | B1 | 1/2004 | Adler et al. | |
| 2001/0014866 | A1 | 8/2001 | Conmy et al. | |
| 2002/0154178 | A1 | 10/2002 | Barnett et al. | |
| 2003/0036941 | A1 | 2/2003 | Leska et al. | |
| 2003/0154116 | A1* | 8/2003 | Lofton | 705/8 |
| 2003/0167664 | A1 | 9/2003 | Mullinax | |
| 2004/0109025 | A1 | 6/2004 | Hullot et al. | |

OTHER PUBLICATIONS

"Calendars to Help You in Countless Ways," iCal information printed from http://www.apple.com/ical, 8 pages.

"Apple Ships iCal," iCal press release dated Sep. 10, 2002, printed from http://biz.yahoo.com/prnews/020910/sftu074_1.html, 2 pages.

"Apple Introduces Personal Information Manager with iCal," iCal press release dated Jul. 17, 2002, printed from http://www.macobserver.com/exporeport/2002/07/17.2.shtml, 4 pages.

Instructions and screenshots from Microsoft Outlook Calendar feature, 4 pages.

Design Your Own Calendars and Forms, Francis Michael, Administrative Management (The Magazine of Office Administration and Automation), v49, n3, p. 43(2). Apr. 1998.

Calendar Creator Plus version 2.0 Sprinkler Software Corporation, Cambridge, MA 02139-1901. Pages ii, iii, 14, 15, 230-235.

Office Communication, United States Patent and Trademark Office, U.S. Appl. No. 10/283,138, Sep. 22, 2004, 45 pages.

Amendment in Reply to Action of Sep. 22, 2004, filed at the United States Patent and Trademark Office, on Dec. 20, 2004, 23 pages.

Office Communication, United States Patent and Trademark Office, U.S. Appl. No. 10/283,138, May 18, 2005, 62 pages.

Amendment in Reply to Action of May 18, 2005, filed at the United States Patent and Trademark Office on Jul. 18, 2005, 25 pages.

Office Communicaiton, Advisory Action, U.S. Appl. No. 10/283,138, filed Oct. 4, 2005, 7 pages.

Amendment in Reply to Advisory Action of Oct. 4, 2005, filed at the United States Patent and Trademark Office on Oct. 31, 2005, 22 pages.

Microsoft Outlook 2000 Calendar & Tasks, Student Guide, Nov. 2, 2001, 26 pages.

Microsoft Office, "Using the Microsoft Outlook 2000 Calendar", White Paper, Oct. 1998, 21 pages.

* cited by examiner

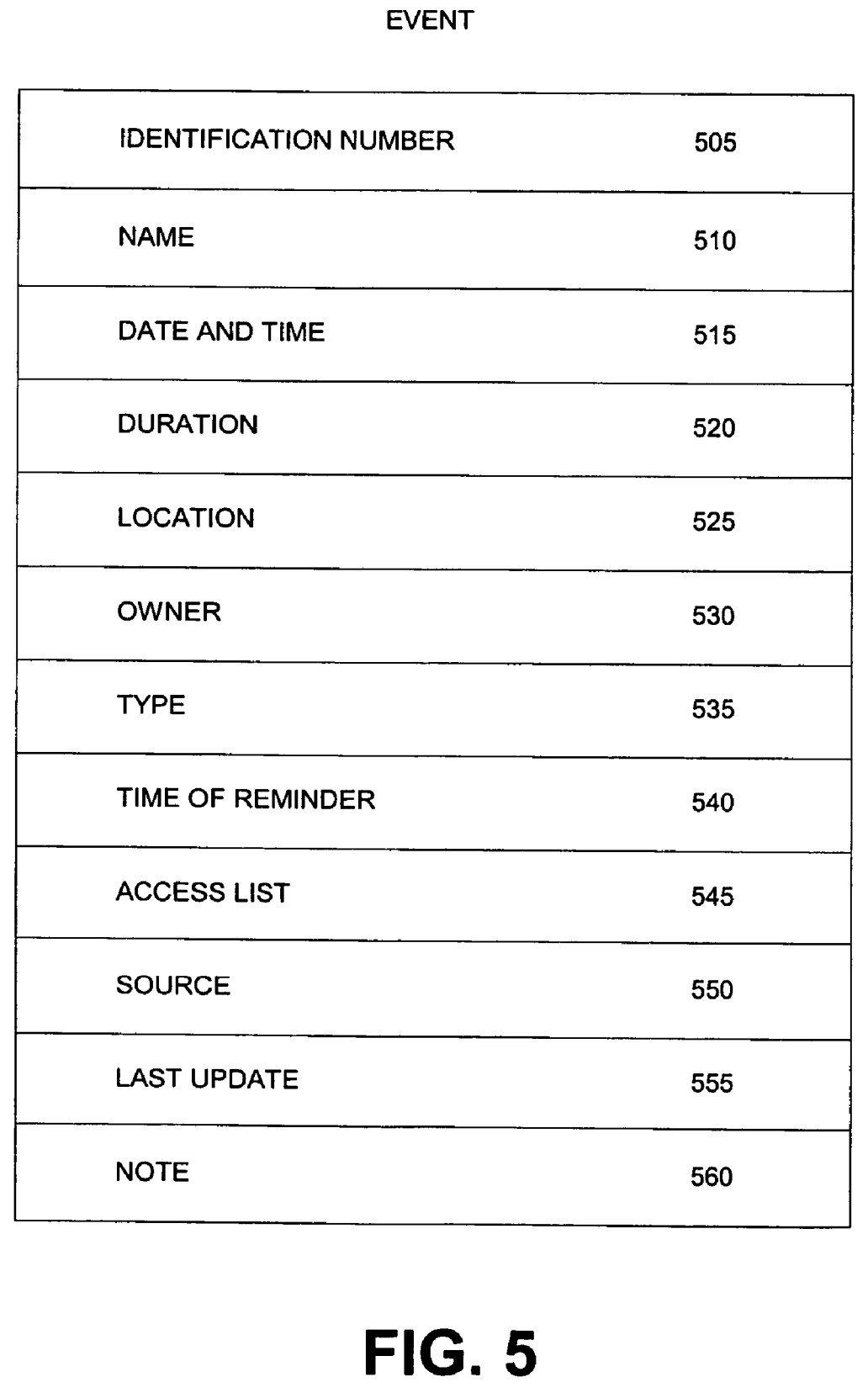

EVENT

| IDENTIFICATION NUMBER | 505 |
|---|---|
| NAME | 510 |
| DATE AND TIME | 515 |
| DURATION | 520 |
| LOCATION | 525 |
| OWNER | 530 |
| TYPE | 535 |
| TIME OF REMINDER | 540 |
| ACCESS LIST | 545 |
| SOURCE | 550 |
| LAST UPDATE | 555 |
| NOTE | 560 |

FIG. 5

CALENDAR OVERLAYS

CROSS-REFERENCE TO RELATED APPLICATIONS

This application is a continuation of U.S. patent application Ser. No. 10/283,138, filed on Oct. 30, 2002 now U.S. Pat. No. 7,039,596, and titled CALENDAR OVERLAYS, that claims the benefit of U.S. Provisional Application No. 60/349,251, filed on Jan. 18, 2002, and titled CALENDAR OVERLAYS, both of which are hereby incorporated by reference.

TECHNICAL FIELD

Certain implementations in the following description relate to electronic calendars, and more particularly to electronic calendars including event information and to calendar overlays.

BACKGROUND

An electronic calendar provides an alternative and/or a complement to a standard paper calendar. An input device, such as, for example, a keyboard, a mouse, or a touch screen may be used to manually create entries in the electronic calendar. If the entries are of interest to multiple entities, then each entity may manually create corresponding entries in their calendar. If the original entries change, then each of the interested entities can be informed of the change, and the calendars of each of the entities can be manually updated.

SUMMARY

An implementation allows a user to electronically access and overlay a calendar owned by another entity. The overlaid calendar may be visually displayed concurrently with the user's own calendar. The overlaid calendar need not be imported into the user's calendar nor stored local to the user's calendar, although these and other options may be available.

According to a general aspect, implementing an electronic calendar includes accessing a first electronic calendar owned by a first party and accessing a second electronic calendar owned by a second party. A view is presented that combines at least one existing entry from within each of the first and second electronic calendars. Source information is electronically maintained for each of the first electronic calendar and the second electronic calendar.

Electronically maintaining source information for each of the first electronic calendar and the second electronic calendar may include maintaining a first source attribute for the first electronic calendar and a second source attribute for the second electronic calendar. Maintaining the second source attribute may include storing a user ID for the owner of the second electronic calendar. The second electronic calendar may be copied. The first electronic calendar and the copy of the second electronic calendar may be maintained in separate files.

At least part of the source information may be presented in the combined view. Presenting at least part of the source information in the combined view may include presenting entries from the first electronic calendar differently than entries from the second electronic calendar. An indication of a source may be provided for entries presented from the second electronic calendar. Presenting the view may include overlaying the first and second electronic calendars. The presented view may include entries from each of the first and second electronic calendars for a specific time period. The combined view may be electronically updated to reflect a change to at least one of the existing entries from within at least one of the first and the second electronic calendars.

An apparatus may include a storage medium having instructions stored thereon that when executed by a machine result in at least the following: accessing a first electronic calendar owned by a first party, accessing a second electronic calendar owned by a second party, presenting a view that combines at least one existing entry from within each of the first and second electronic calendars, and electronically maintaining source information for each of the first electronic calendar and the second electronic calendar. The storage medium may include instructions stored thereon that when executed by a machine result in electronically updating the combined view to reflect a change to at least one of the existing entries from within at least one of the first and the second electronic calendars.

An apparatus for implementing an electronic calendar may include a storage device and a processor communicatively coupled to the storage device and programmed to perform at least the following operations: access a first electronic calendar owned by a first party, access a second electronic calendar owned by a second party, present a view that combines at least one existing entry from within each of the first and second electronic calendars, and electronically maintain source information for each of the first electronic calendar and the second electronic calendar. The processor may be further programmed to electronically update the combined view to reflect a change to at least one of the existing entries from within at least one of the first and the second electronic calendars.

An apparatus for implementing an electronic calendar may include a mechanism for accessing a first electronic calendar owned by a first party, a mechanism for accessing a second electronic calendar owned by a second party, a mechanism for presenting a view that combines at least one existing entry from within each of the first and second electronic calendars, and a mechanism for maintaining electronically source information for each of the first electronic calendar and the second electronic calendar. The apparatus may include a mechanism for electronically updating the combined view to reflect a change to at least one of the existing entries from within at least one of the first and the second electronic calendars.

According to another aspect, implementing an electronic calendar includes accessing a first electronic calendar owned by a first party and accessing a second electronic calendar owned by a second party. A view is presented that combines at least one existing entry from within each of the first and second electronic calendars, and the combined view is updated electronically to reflect a change to at least one of the existing entries from within at least one of the first and second electronic calendars.

Updating the combined view may include accessing the first and second electronic calendars a second time after a change has been made to an existing entry in each of the first and second electronic calendars. Updating the combined view may further include presenting a second view that combines at least part of each of the changed first electronic calendar and the changed second electronic calendar, including at least one changed existing entry in each of the first and second electronic calendars. Information of the second electronic calendar may be maintained separate from information of the first electronic calendar.

The accessed first electronic calendar may be at a location remote from the accessed second electronic calendar. A copy of the second electronic calendar may be stored at a location local to the first electronic calendar. A source attribute may be maintained for the stored copy of the second electronic calendar, and the stored copy of the second electronic calendar may be updated using the source attribute. Updating the stored copy may include determining that the second electronic calendar at the remote location is more recent than the copy, and copying the more recent second electronic calendar to the local location. The source attribute may identify an entity with a right to modify an event in the second electronic calendar.

Information from the second electronic calendar may be integrated into the first electronic calendar. A source attribute may be added to the integrated information from the second electronic calendar.

Presenting the view may include displaying the view on a screen or printing the view on paper. Presenting the view that combines at least one existing entry from within each of the first and second electronic calendars may include presenting a view that combines events for a given time period from each of the first and second electronic calendars. Presenting the view that combines at least one existing entry from within each of the first and second electronic calendars may include visually distinguishing presented events based on whether presented events come from the first or second electronic calendars. Distinguishing may include using a first icon for events from the first electronic calendar and using a second icon for events from the second electronic calendar. Presenting the view that combines at least one existing entry from within each of the first and second electronic calendars may include presenting events from the first electronic calendar in the same manner as events from the second electronic calendar. Presenting the view that combines at least one existing entry from within each of the first and second electronic calendars may include overlaying the first and second electronic calendars. Presenting the view that combines at least one existing entry from within each of the first and second electronic calendars may include presenting the first and second electronic calendars side-by-side in the view.

Event information from the second electronic calendar may be imported into the first electronic calendar. An event from the second electronic calendar may be imported into the first electronic calendar, the event including event information. Importing the event may include copying the event and designating the copied event as being owned by the second party. An attribute may be maintained for the imported event information that identifies the event information as being imported. The imported event information may be updated. The second electronic calendar may be imported into the first electronic calendar.

A notice may be provided for an event in the accessed second electronic calendar. The notice may be provided based on a predetermined criterion in the second electronic calendar. An application may perform the accessing of the second electronic calendar and the notice may be provided based on a criterion determined using the application. Providing the notice may include providing a reminder for the event.

An apparatus may include a storage medium having instructions stored thereon that when executed by a machine results in accessing a first electronic calendar owned by a first party, accessing a second electronic calendar owned by a second party, presenting a view that combines at least one existing entry from within each of the first and second electronic calendars, and electronically updating the combined view to reflect a change to at least one of the existing entries from within at least one of the first and second electronic calendars. The storage medium may include a disk.

An apparatus for implementing an electronic calendar may include a storage device and a processor that is communicatively coupled to the storage device and programmed to access a first electronic calendar owned by a first party, to access a second electronic calendar owned by a second party, to present a view that combines at least one existing entry from within each of the first and second electronic calendars, and to update electronically the combined view to reflect a change to at least one of the existing entries from within at least one of the first and second electronic calendars. A display may be communicatively coupled to the processor and operable to present the view.

An apparatus for implementing an electronic calendar may include a mechanism for accessing a first electronic calendar owned by a first party, a mechanism for accessing a second electronic calendar owned by a second party, a mechanism for presenting a view that combines at least one existing entry from within each of the first and second electronic calendars, and a mechanism for updating electronically the combined view to reflect a change to at least one of the existing entries from within at least one of the first and second electronic calendars. The mechanism for accessing the first electronic calendar may include a processor communicatively coupled with a first storage device having instructions for accessing the first electronic calendar. The mechanism for accessing the second electronic calendar may include a processor communicatively coupled with a second storage device having instructions for accessing the second electronic calendar. The mechanism for presenting the view may include a display. The mechanism for updating the combined view may include a processor communicatively coupled to a third storage device having instructions for updating the combined view. The mechanism for accessing the second electronic calendar may further include an interface to a network, the interface being communicatively coupled to the processor and operable to access the second electronic calendar over the network.

The details of these and other features are described in the accompanying drawings and the description below. Other features will be apparent from the description, the drawings, and the claims.

DESCRIPTION OF DRAWINGS

FIG. 5 is a block diagram depicting an example of an event having event information.

DETAILED DESCRIPTION

An implementation described below may allow a user to track events in another entity's electronic calendar without (i) the user manually entering the tracked events into the user's calendar, (ii) the other entity having to inform the user of changes to the tracked events, and (iii) the user having to manually edit tracked events that do change.

In one such implementation, the other entity publishes all or part of an electronic calendar. The user references or otherwise selects the published calendar and displays the published calendar as an overlay over the user's own calendar. The events from the other entity's overlaid calendar may be displayed in a different format so that the user can readily distinguish which events belong to the user's calendar and which events belong to the other entity's calendar.

In this implementation, all copies of the other entity's calendar remain separate from the user's calendar. Thus, if the user "dereferences" the other entity's calendar then events from the other entity's calendar will no longer be accessed or displayed. Because the calendars remain separate, as long as the other entity's calendar is published and referenced by the user, then each time the user opens and displays the user's calendar the other entity's published calendar is re-accessed. If the other entity modifies and republishes, if necessary, its calendar, then the next time the user's calendar is opened or updated (e.g., periodic or triggered refresh for referenced sources), the modified calendar of the other entity will be accessed and displayed with updates to the user.

Figure 1:
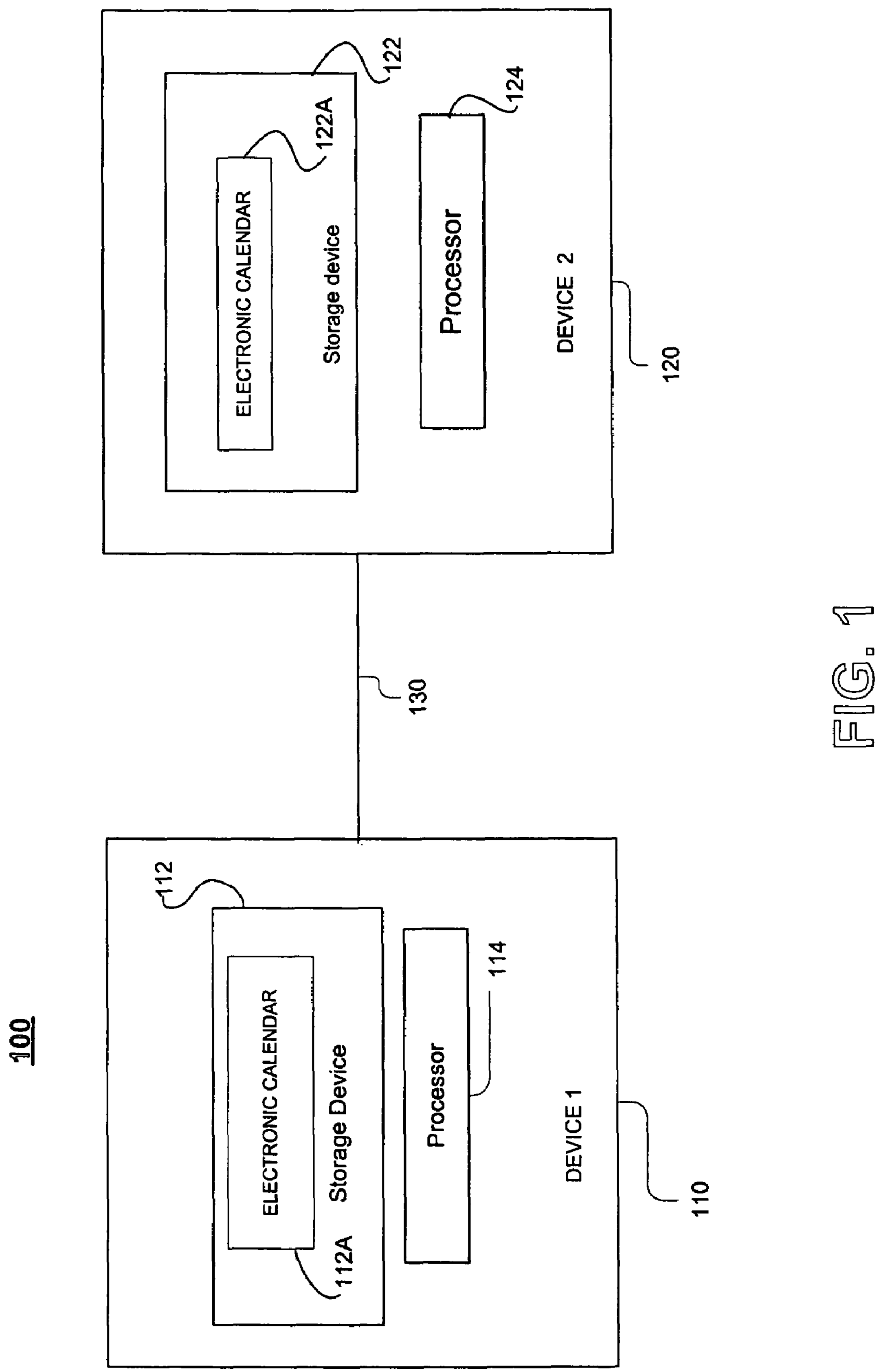
FIGS. 1 and 2 are examples of systems for implementing an electronic calendar.

FIG. 1 shows a system 100 used to implement an electronic calendar, the system including a first device 110 and a second device 120. The first device 110 and the second device 120 may be implemented using a variety of electronic devices, such as, for example, a main frame, a host, a work station, a computer, a personal digital assistant, or a mobile phone.

The devices 110, 120 include storage devices 112, 122 for storing electronic calendars 112A, 122A. Although not shown in the system 100, electronic calendars are conceptualized for the present purposes as including one or more electronic "events," each electronic event including "event information" relating to that event. An electronic calendar may consist of a portion of another electronic calendar.

The devices 110, 120 also include processors 114, 124 operable to manage (in concert, perhaps, with other devices not shown) the electronic calendars 112A, 122A. The processors 114, 124 may be implemented, for example, using digital signal processors, application specific integrated circuits, controller chips, or other intelligent devices capable of executing instructions. The devices 110, 120 are coupled with a communications link 130.

Figure 2:
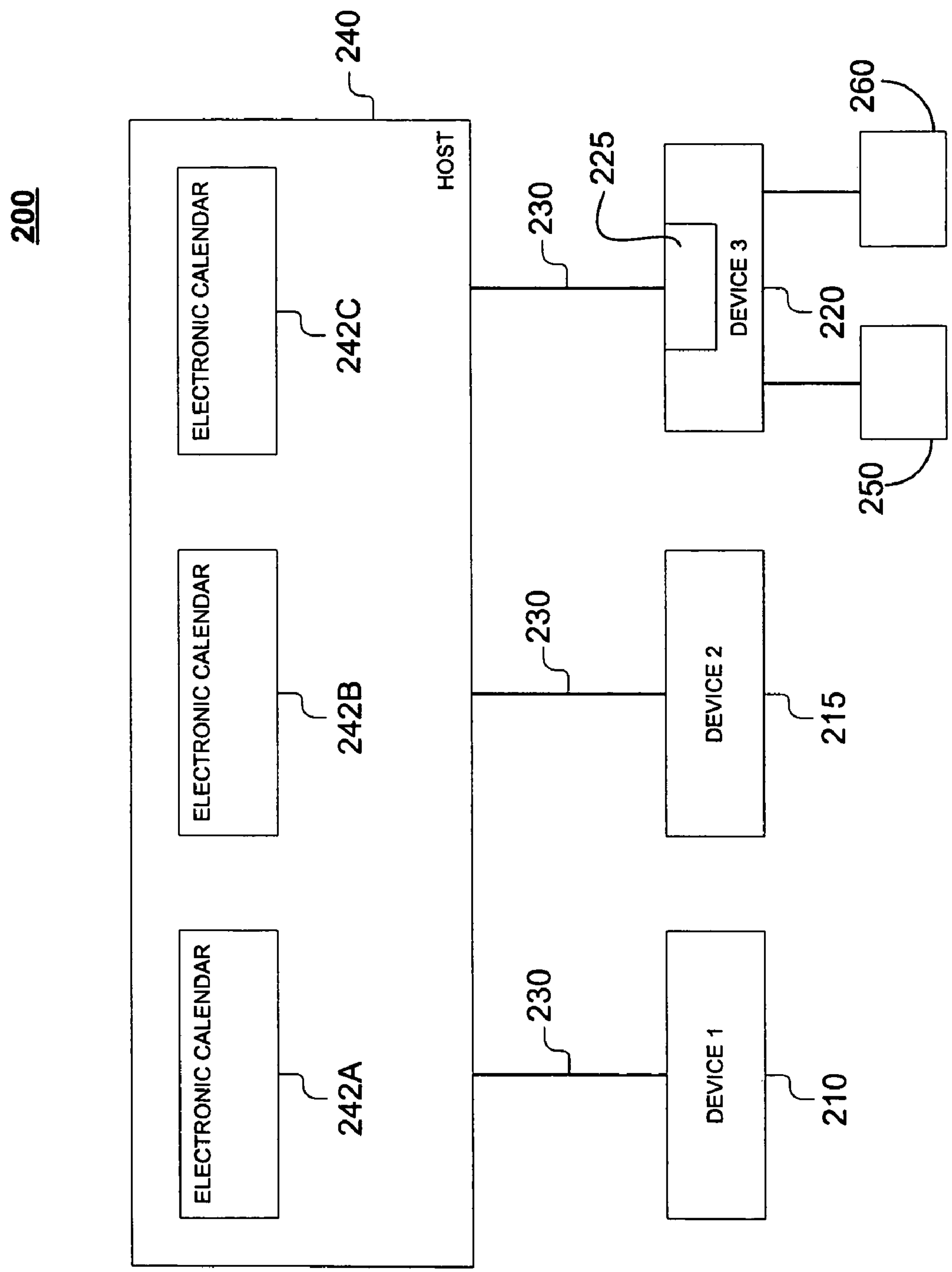

FIG. 2 shows another system 200 capable of implementing electronic calendars in a client-server arrangement. The system 200 includes three devices 210, 215, 220 that are each analogous to either of the devices 110, 120. The device 220 is shown including an interface 225 for communicating over a communications link 230 with a host 240. The communications link 230 is analogous to the communications link 130. Although no interface is shown for the devices 210, 215, the devices 210, 215 may also communicate with the host 240 over the communications link 230. The host 240 includes three electronic calendars 242A, 242B, 242C that may, for example, each be accessed by a user operating one of the devices 210, 215, 220. The device 220 is also shown as being coupled to a display 250 and a printer 260 for presenting event information to a user of the device 220.

Figure 3:
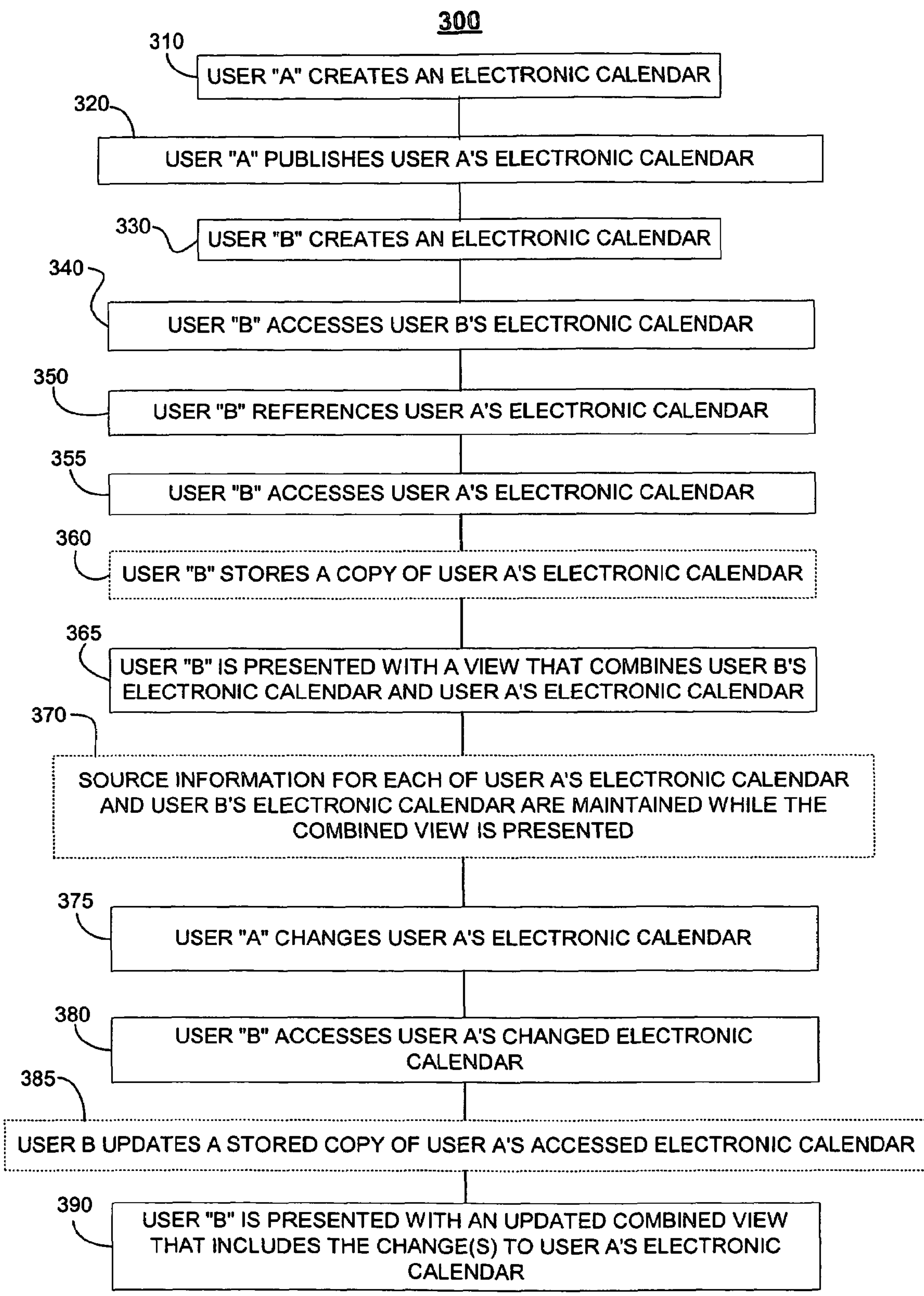
FIG. 3 is a flow chart of an exemplary process for overlaying electronic calendars.

FIG. 3 shows a process 300 for overlaying electronic calendars in which software is used by a first user to create an electronic calendar (310) and publish the created electronic calendar (320). Software is used by a second user to create (330) and access (340) another electronic calendar, and to reference (350) and access (355) the first user's published calendar.

The first and second user's calendars may reside on devices that are local to, or remote from, each other. Publishing a calendar refers to making the calendar accessible, and publishing may include, for example, (i) allowing read-access to a file or database containing the calendar, (ii) placing the calendar, or a copy, on a publish/subscribe service, a web page, a server, or some other accessible device, or (iii) providing a link, address, file name, or other descriptor for the calendar. Referencing a calendar refers to indicating a desire to access the calendar, and referencing may include, for example, (i) entering the calendar's link, address, file name, or other descriptor in a calendar application, or (ii) selecting the calendar from a list or other collection of published calendars. Accessing a calendar refers to accessing at least part of the information in the calendar, and accessing may include, for example, (i) reading the calendar, (ii) receiving the calendar, (iii) downloading the calendar, (iv) storing the calendar, (v) copying the calendar, or (vi) transmitting the calendar.

The process 300 optionally includes the second user storing a copy of the first user's accessed electronic calendar (360). Although other operations of FIG. 3 not identified by a dashed box may be optional as well, the dashed box around operation 360 indicates that the operation is optional. The copy may be stored in a volatile storage device, such as, for example, random access memory ("RAM"), or in a non-volatile storage device, such as, for example, a hard disk, a floppy disk, or a compact disk. A stored copy of an accessed electronic calendar may be stored in a separate file or database, so as to avoid commingling the events and other information of the two electronic calendars. Avoiding commingling, by using separate storage, may facilitate removing the electronic calendar if the accessed electronic calendar is either "depublished" by the first user or "dereferenced" by the second user.

The process 300 includes presenting the second user with a view that combines the electronic calendars of the first and second users (365). The view may combine all, or only a portion, of the electronic calendars of the first and second users.

The combined view may distinguish between events or other information attributable to the first user's electronic calendar and events or other information attributable to the second user's electronic calendar. If distinctions are made, the distinctions may include, for example, using a different color, font, font size, or icon for each of the electronic calendars. The combined view and distinctions may be presented on a variety of media capable of supporting a visual representation of data, such as, for example, a display, or a printed sheet. The combined view and distinctions also may be presented in other modes, such as, for example, (i) a voice-spoken mode in which the events or other information are read/spoken to a user, or (ii) a computer-readable mode in which the events of other information of the combined view are, for example, copied to a digital file for transmission, storage, viewing in another application or format, or viewing at another location or at a later time.

The process 300 optionally includes maintaining a source attribute for each of the first and second user's electronic calendars (370). Source attributes indicate the source of the electronic calendar. A source of an electronic calendar generally refers to an entity having a right to modify the electronic calendar, or to an address or other indicator for an entity having a right to modify the electronic calendar. For example, in the FIG. 3 example, the first user may be identified and maintained as the source of the first user's calendar, even once that calendar is presented in a combined view with the second user's calendar, if the first user maintains the ability to modify entries in the first user's calendar. Source attributes may include, for example, (i) a user name or number, where the user is the source, (ii) a web address for the source, (iii) an index, offset, printer, or other reference to a source or source address, or (iv) a file name. If no entity has a right to modify an electronic calendar, the source of the electronic calendar may be taken to be the source of the parent of the electronic calendar. For example, in implementations in which an electronic calendar is copied in read-only format, no entity has a right to modify the electronic calendar (deleting the electronic calendar by, for example, dereferencing the electronic calendar, is not considered in this instance to be modifying the read-only copy of the electronic calendar). However, if the original electronic calendar from which the read-only copy was made—the parent—can be modified, then the source of the parent may be taken to be the source of the read-only copy.

A source of an electronic calendar may also refer to, for example, an entity to which the electronic calendar relates, even if that entity does not have a right to modify the electronic calendar. For example, a school may create and maintain calendars for each of its students that list the school's events relevant to each particular student. The school may, however, publish these calendars on each student's personal home page under the names of the individual students. In such a case, the source may be taken to be the student, and all source attributes may reflect the student, even though the student cannot modify the calendar. The terms "source" and "owner," and their cognates, may be used interchangeably unless otherwise noted.

Additionally, the source may be used to reference entities such as the creator of a calendar or entry within a calendar. Where the first user changes the event information in the first user's electronic calendar (375), the second user may access the first user's changed electronic calendar (380). For instance, the second user may optionally update a stored copy of the first user's accessed electronic calendar (385).

More particularly, in one implementation, the published calendar may be modified by the first user after the second user accesses the calendar. In such a case, it may be advantageous to update the second user's stored copy, if any, of the first user's calendar. Updating, in this context, refers to storing the modified event information of the first user's calendar, and updating may include, for example, accessing the published calendar anew. Determining whether, or when, to update the stored calendar may include, for example, (i) determining whether updating is necessary by, for example, comparing version numbers, revision dates, or digital signatures associated with the stored calendar and the modified calendar, or comparing contents in the stored and modified calendars, (ii) automatically updating the stored calendar based on a triggering event or after a predetermined amount of time has passed, e.g., between updates, (iii) receiving an indication that an update is needed or available, the indication being provided by the first user or some other entity, and (iv) receiving the modified calendar from the first user automatically, or in response to a request from the second user. Avoiding commingling, by storing the copy of the first user's calendar separately from the second user's calendar, may also facilitate updating the accessed calendar.

In a broadband implementation, or other implementation in which the second user may be presented with the combined view for an extended period of time, it may be necessary or desirable to seek an update at regular intervals. This may be provided, for example, by a daily update dialog box being presented to the second user asking the second user if an update is desired and, if an update is desired, executing a routine or other functionality to provide the update. If the first user's calendar is not stored, but the event information is merely presented in a combined view, updates may also be desirable if, for example, the view is presented for an extended period of time.

In host-based implementations in which calendars are maintained on a host system, a user may download a copy of all accessed calendars so that the calendar information is available while the user is off-line. In these implementations, it may be desirable for the host system to automatically suggest an update to any locally-stored accessed calendars when the user next logs in.

The process 300 includes the second user being presented with an updated combined view that includes the change(s) to the first user's electronic calendar (390). The updated view may be presented, for example, with or without the accessed calendar being copied and stored.

Figure 4:
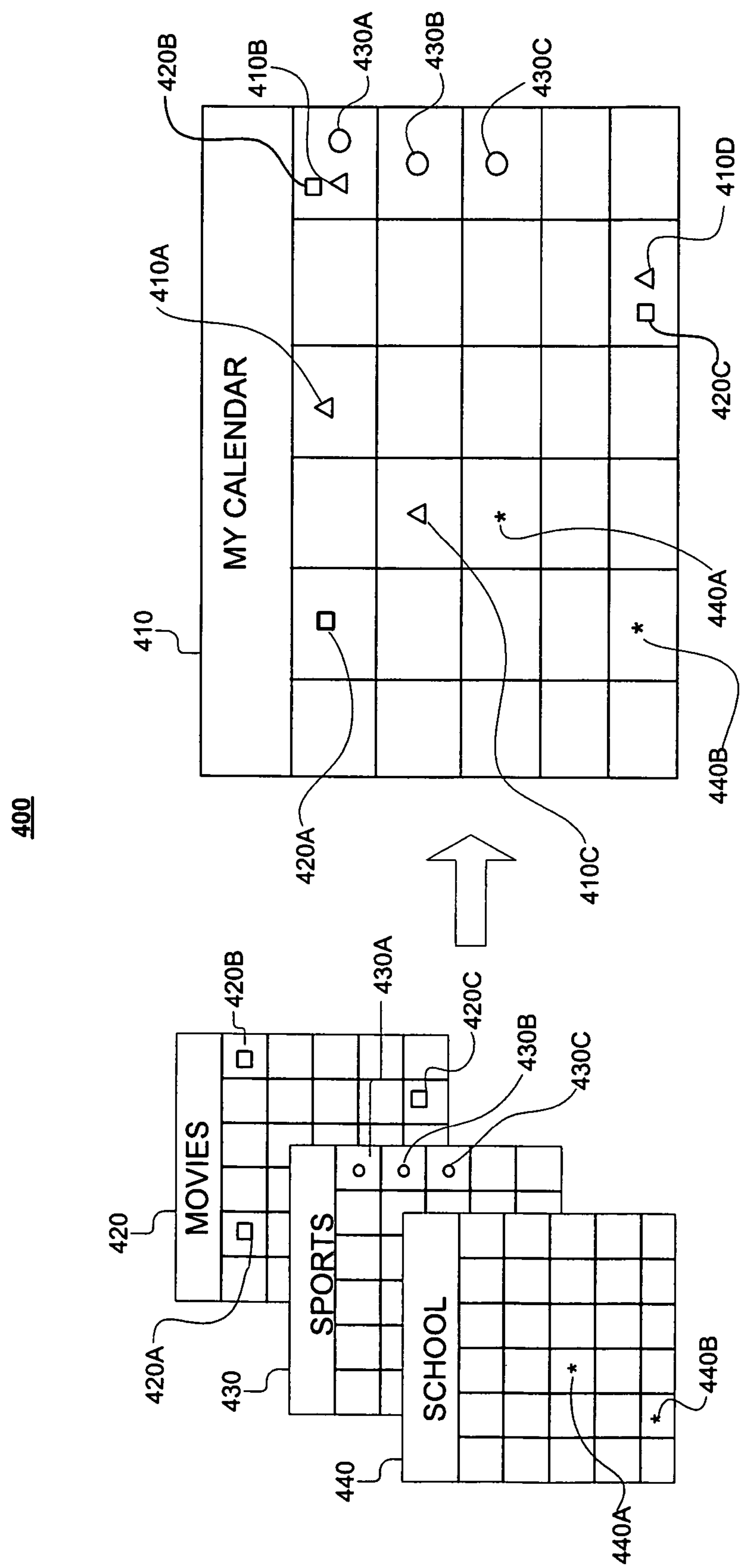
FIG. 4 is an illustration of an example involving overlaying four electronic calendars.

FIG. 4 shows a graphic illustration 400 of an implementation of the process 300 that includes a personal calendar 410 ("My Calendar") that is owned by a user. The personal calendar 410 may, for example, be owned by a high school student and include several events 410A, 410B, 410C, 410D owned by the student. A number of other calendars may be accessed from a number of different sources (e.g., websites on the Internet). The illustration 400 includes three additional calendars: a movie calendar 420, a sports calendar 430, and a school calendar 440. The movie calendar 420 includes movie events 420A, 420B, 420C (e.g., first release dates for new films). The sports calendar 430 includes a team schedule having team events 430A, 430B, 430C (e.g., team games). The school calendar 440 includes school events 440A, 440B (e.g., class registration 440A and holiday 440B).

The student may be given access to the calendars 410, 420, 430, 440, and to the event information contained within those calendars, part or all of which may be controlled by other parties. The calendars 410, 420, 430, 440 may be accessed using, for example, the Internet, a dial-in network, or some other network. An example follows.

The student may access a movies calendar 420 using an online service provider ("OSP"). The movies calendar 420 may be maintained by a third party (e.g., a movie production company) to list the dates and times of movies. The sports calendar 430 may be controlled by the same or a different third party (e.g., a city league, in which the student plays volleyball) to list information and/or game schedules. In addition, the student may access school calendar 440 using a dial-in network. The school calendar 440 may be controlled by yet another or the same third party (e.g., a high school) to list various school events, such as, for example, holiday functions, class schedules, and parent-teacher meetings.

Referring to the illustration 400, the movie production company may create (310) and publish (320) the movies calendar 420, the city league may create (310) and publish (320) the sports calendar 430, and the school may create (310) and publish (320) the school calendar 440. The student may create (330) and access (340) the personal calendar 410. The student may then reference the movies calendar 420, the sports calendar 430, and the school calendar 440 (350) by, for example, selecting the three calendars 420, 430, 440 from among a list of published calendars that the student can access. The student may then access the three referenced calendars 420, 430, 440 (355) and be presented with a view that combines the personal calendar 410, the movies calendar 420, the sports calendar 430, and the school calendar 440 (365), as indicated in FIG. 4.

The calendars 420, 430, 440 may be referred to as overlays, and as overlaying the personal calendar 410. In the above implementation, the three calendars 420, 430, 440 are overlaid on the personal calendar 410 much as a transparency may be overlaid on another transparency using an overhead projector, such that the four electronic calendars 410, 420, 430, 440 are presented as a single integrated interface. Further, the combined view need not identify the source of the movie events 420A, 420B, and 420C, the team events 430A, 430B, 430C, or the school events 440A, 440B. Conversely, source information could be displayed or made available in a variety of ways including, for example, using different colors or making source information available when a user clicks with a mouse. Additionally, ownership of the overlaid event information from calendars 420, 430, and 440 is not affected by accessing or overlaying.

The school may, at a later date, change some of the information in the school calendar 440 (375). The student may access the changed school calendar 440 (380) and be presented with an updated combined view of the four calendars 410, 420, 430, 440, including the change(s) to the school calendar 440 (390). Note that the changes and thus the updates presented in the combined view may include additions or deletions or repositioning of events or information within the school calendar 440.

Although the personal calendar 410 is shown as being integrated into the calendar application, the personal calendar 410 may be stored, like any or all of the other calendars 420, 430, 440.

Implementations of the process 300 may include a variety of additional features. Two examples of such features include notices and punching.

Notices, such as, for example, alerts and reminders, may be provided for events or event information in one or more of the accessed calendars. In one implementation in which a first user accesses a second user's calendar, notices that are already part of the second user's calendar are also provided to the first user when the combined view is presented to the first user. As an example, if an accessed calendar owned by a second user includes an event with a one-hour reminder associated with that event, then the accessing entity (the first user) may also receive the one-hour reminder. Such notices are based on a predetermined criterion in the second user's electronic calendar. In another implementation, notices do not carry over when an electronic calendar is accessed by other than the owner, or notices of the other accessed calendar may be supplemented by notices set by an accessing party. In these implementations, the accessing entity sets its own notices using its electronic calendar application, and such notices are based on a criterion determined using the application. Using the previous example, the first user would not receive the one-hour reminder but the first user's calendar application may generate a reminder for the event (and for all events in the second user's calendar) using, for example, a default setting (e.g., thirty minutes) in the first user's calendar application. The reminders generated by the first user's calendar application could be stored, for example, separate from the first user's calendar and associated with the second user's calendar using, for example, a pointer field. In this way, if the first user dereferences the second user's calendar, then the notices can be automatically deleted.

Event information also may be "punched" from a first electronic calendar into a second electronic calendar. When event information, for example, is punched from an overlay electronic calendar, that event information will continue to be displayed even when the overlay electronic calendar is dereferenced and is no longer being overlaid. The event information may include an entire electronic calendar, one or more events, or one or more pieces of event information relating to one or more events. The imported event information may also be augmented by information, such as, for example, a source attribute and/or an attribute designating the event information as being imported. The augmentation may facilitate operations on the imported event information, such as, for example, deleting all imported event information, deleting specific imported event information, updating specific imported event information, or updating all imported event information.

The term "event information" is generally discussed above, and more specific implementations are now described with respect to FIG. 5. Event information may include information that relates to or defines one or more electronic events, such as, for example, an identification number 505, a name 510, a date and time 515, a duration 520, a location 525, an owner 530, a type 535, a time of reminder 540, an access list 545, a source 550, a last update 555, and a note 560, each of which is described in further detail below.

An identification number 505 may include a unique identifier to refer to an electronic event, such as, for example, an alphanumeric sequence. The identification number may be used to search for or to update an electronic event or event information.

A name 510 also may be used to identify or describe an electronic event, such as, for example, the purpose of an electronic event. Some examples of names include: (1) "Financial Aid Meeting" (e.g., to describe a meeting with a financial aid counselor concerning tuition expenses); (2) "Tuition Due Today" (e.g., to describe a deadline for paying tuition); or (3) "Tuition Due in 3 Days" (e.g., to describe a reminder that the deadline is approaching).

A date 515 may be used to indicate when an electronic event occurs. The date may include a month, a day, and a year. A date also may include a time of day to indicate, for example, the start or end of an electronic event.

A duration 520 of may be used to indicate the length of an electronic event.

A location 525 may be used to indicate one or more locations where a physical occurrence relating to an electronic event takes place. Using the examples above, the location associated with the electronic event named "Financial Aid Meeting" may be "Financial Aid Building-Room 340."

An owner 530 may include one or more names or other identifiers for entities that have the right to enter, modify, delete, or otherwise control event information pertaining to an electronic event. The owner may be an individual, a group, or a collective entity (e.g., a department, a business/corporation, a municipality, a building, or a team). An owner may have complete control of the electronic event, and/or different levels of control may be apportioned among one or multiple owners. In addition, event information within an event may have different and/or multiple owners.

A type 535 may be used to indicate a category or kind of electronic event. The type may be selected from a list, such as, for example, sports events, social events, educational events, and work events. The type may be used to facilitate searches for electronic events and to organize electronic events.

A time of reminder 540 may include the amount of time, before the time of an electronic event, that an entity desires as advance notice. For example, a time of reminder may be set to minutes, hours, or days before the time of an electronic event. In addition, multiple reminders may be set for the same event.

An access list 545 may include a list of entities that are permitted to access an electronic event and/or particular event information associated with an electronic event. An access list may be useful in controlling access to an electronic event that is published.

A source 550 may identify the creator of an electronic event, the location at which the electronic event was created, or the location from which an electronic event or event information was imported. For example, the source may include a link or a tag to an electronic calendar from which an electronic event was imported. The source may be checked to determine whether an electronic event has been modified. For example, an implementation may compare some or all of the contents of the electronic event at the source with the contents of the imported electronic event, or, more specifically, an implementation may compare event information relating to a last update (explained below) from both the source and the imported electronic event. The source may correlate with an owner of an electronic event.

A last update 555 may indicate the last time an electronic event, or event information, was updated or modified. The last update may be used to determine whether to update an electronic event or particular event information associated with an event.

A note 560 may include any information that an owner or source wants to be associated with an event. For example, a note may be used as a scratch pad associated with an electronic event. A note may be entered, for example, by an owner of the electronic event, an owner of an electronic calendar importing an electronic event, or another authorized entity.

The preceding examples are for illustration only, and other items commonly associated with, for example, calendars, tasks, and scheduling programs may be included as event information. An event need not include all of the event information described above. Further, the event information depicted in FIG. 5 as relating to a specific event also may relate to one or more other events.

Event information may be stored in any format that may be used by an electronic calendar. For example, event information may be stored in an application-specific format for a particular calendar application. Conversely, event information may be stored in a standardized format and be organized in fields, such as those found in a database, a spreadsheet, or similar applications.

Event information may be initialized with default information that may be changed by a source or an owner. For example, a time of reminder may include a default setting of five minutes that may be changed by an owner to one hour.

Electronic events may be dependent or independent. An independent electronic event does not relate to other electronic events, whereas, dependent electronic events may include event information that relates to one or more electronic events. An example of a dependent electronic event is an automatically generated electronic event for a reminder for an electronic event for a meeting; the reminder event is dependent on the meeting event at least in that if the meeting event is deleted before the reminder event is triggered then the reminder event is deleted also. As the reminder event example illustrates, dependent electronic events may include electronic events that are automatically related. Dependent electronic events may also be manually related.

Figure 6:
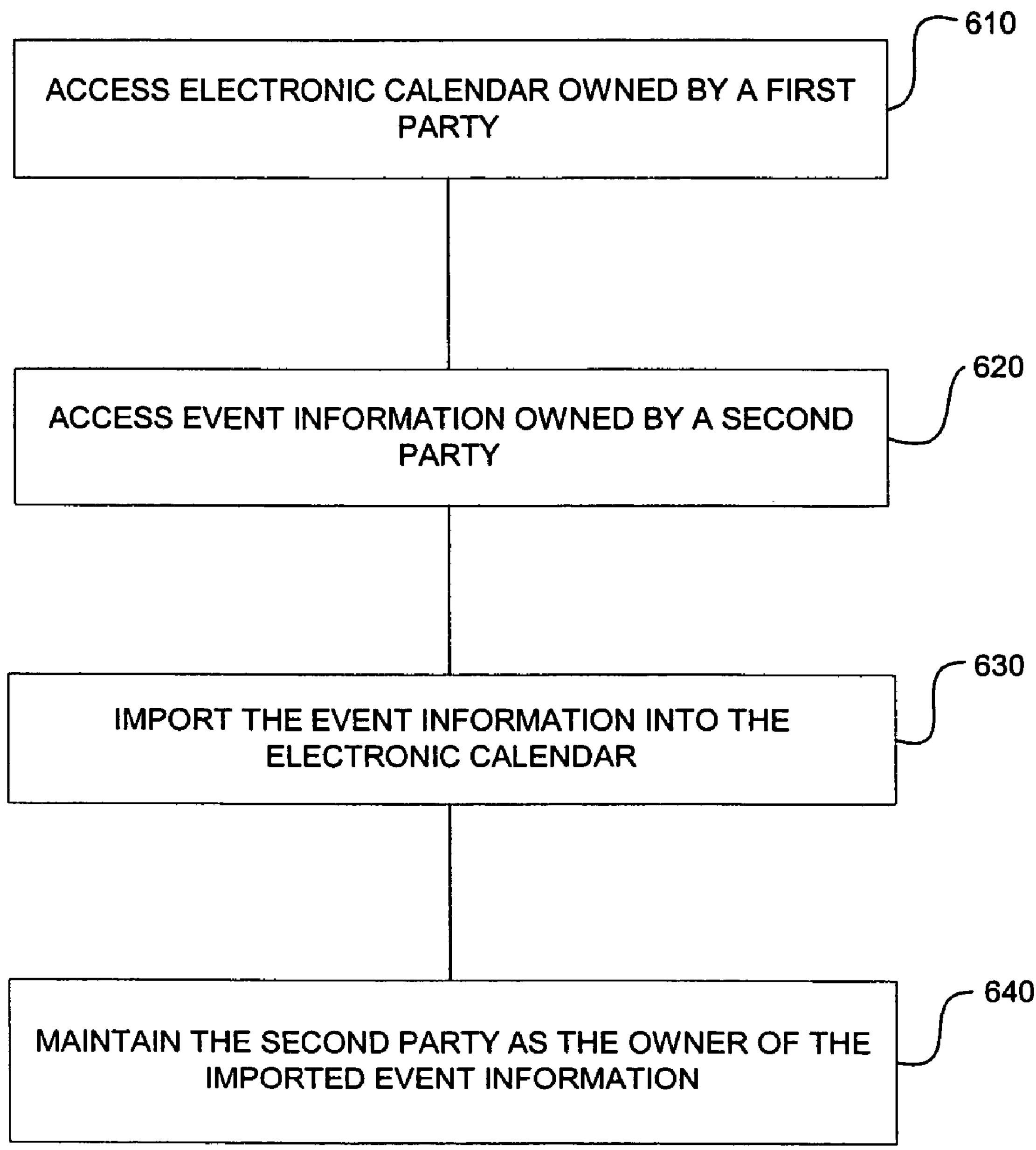
FIG. 6 is a flow chart of an exemplary process for importing event information into an electronic calendar.

FIG. 6 shows a process 600 for importing event information into an electronic calendar. The process 600 includes accessing an electronic calendar owned by a first party (610). The first party's electronic calendar may be accessed, for example, by a calendar application operated on a personal computer by a user to open the first party's electronic calendar.

The process 600 includes accessing event information owned by a second party that is distinct from the first party (620). The event information may be, for example, contained within an electronic calendar owned by the second party, or the event information may include an entire second electronic calendar. In one implementation, event information and electronic calendars are published and can be accessed by anyone with appropriate privileges. The event information may be accessed from, for example, a local storage device, a network server, or a publishing system. The accessed event information also may be stored to a local file so that it can be reaccessed easily.

The process 600 includes importing the event information owned by the second party into the electronic calendar owned by the first party (630), and maintaining the second party as the owner of the imported event information (640). Thus, the first party does not become the owner of the imported event information.

The process 600 may be implemented by a user that is neither the first party nor the second party. The user may be, for example, a party having access to the calendar of the first party and the event information of the second party. Furthermore, more than one set of event information may be accessed by the user from one or more second parties.

Figure 7:
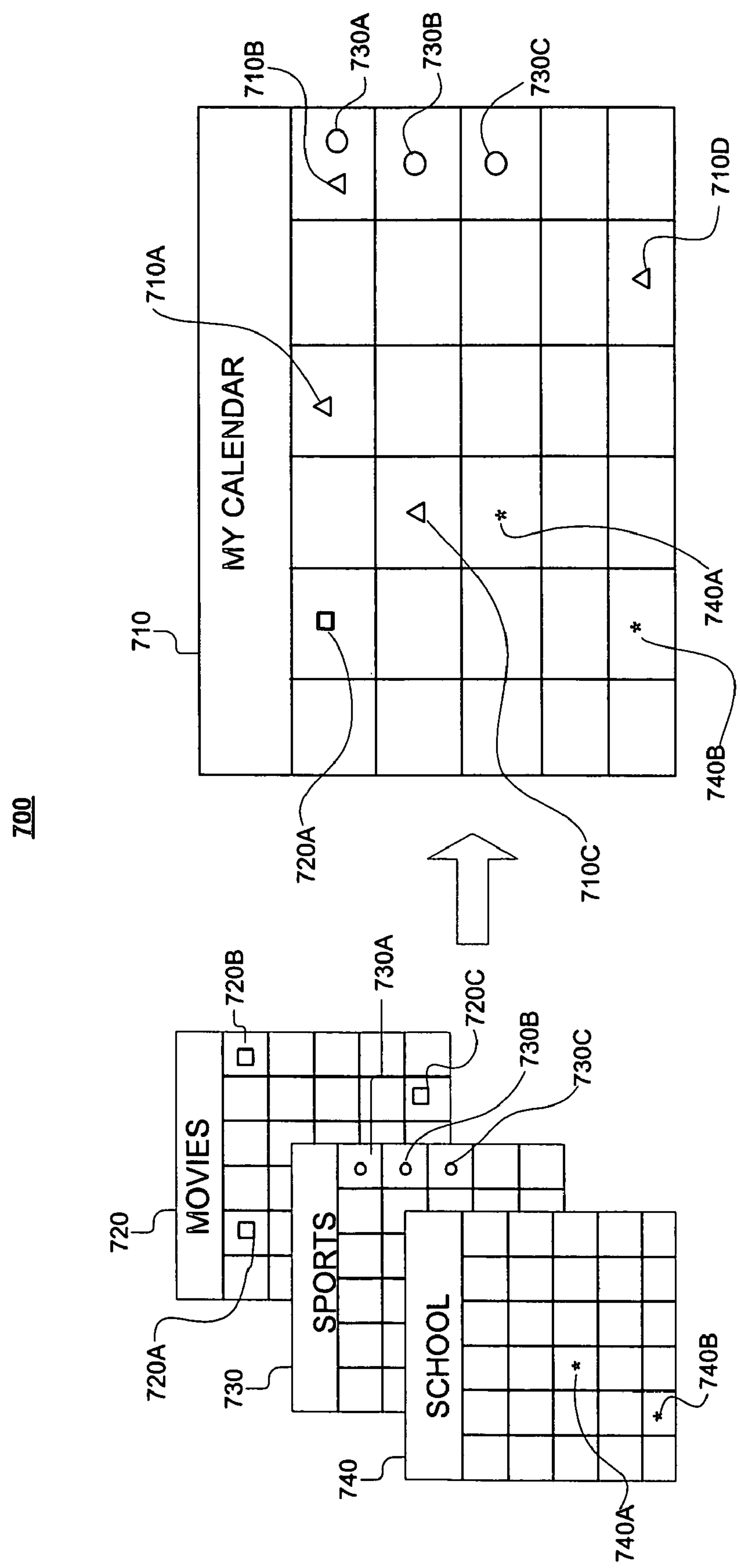
FIG. 7 is an illustration of an example involving importing event information into an electronic calendar.

FIG. 7 shows a graphic illustration 700 of an implementation of the process 600. The illustration 700 is similar to the illustration 400 and like reference numerals indicate like elements. The illustration 700 differs from the illustration 400 principally in that events 720B, 720C are not shown in the view of "My Calendar." The illustration 700 includes the student accessing the student's personal electronic calendar 710 (610). The student also accesses selected or all events in one or more of other available calendars 720, 730, 740. As indicated, the student accesses the following: (i) one event 720A in the movies calendar 720 (620); (ii) all of the events 730A, 730B, 730C in the sports calendar 730 (620); and (iii) both events 740A, 740B in the school calendar 740 (620). Access to the movies calendar 720 may be provided by, for example, linking to a website that maintains the movies calendar 720, scrolling through a published movie list in the movies calendar 720, and/or electronically searching the movies calendar 720 for a particular movie. The student then imports the accessed events into the personal calendar 710 (630), and the imported data is shown in the student's personal calendar 710. Ownership of the imported event information from the calendars 720, 730, 740 is not affected by importing (640).

As the above implementation reveals, the accessed event information may include an entire calendar 730 or 740, or just part of an electronic calendar (event 720A). The granularity of what can be accessed and imported (or overlaid, in other implementations) depends, in part, on the publisher and on the importing (overlaying) entity. Various implementations provide for accessing and importing (overlaying), for example, (i) an entire calendar, (ii) a month, or other time period, of an entire calendar, wherein the time period may be published separately from other time periods, (iii) specific events within a calendar, and/or (iv) specific event information within a calendar. Specific event information might be accessed and imported (overlaid) if, for example, a user wanted merely to show the time period for the games 730A, 730B, 730C as being blocked out but not indicating what event was occurring, perhaps because the information was subject to change.

The accessed calendars and event information may be associated with a source attribute (previously described) that allows the calendars and event information to be reaccessed and reimported (or reoverlaid) every time the student accesses the personal calendar 710. An attribute may be maintained with the accessed data, for example, when the date is copied, stored, or imported, or the attribute may be maintained separate from the accessed data. An attribute may be accessed by the student's calendar, for example, to determine what further data to access.

If the calendars 720, 730, 740 and their event information are accessed from local copies, then the local copies may need to be updated if the source information changes. If source attributes are kept, updating may be done efficiently and even automatically. In addition to the previous examples given, updating may be performed, for example, (i) automatically each time the personal calendar 710 is displayed or otherwise accessed, (ii) automatically each time the student logs in to a publisher or network through which the calendars 720, 730, 740 are accessible, (iii) on command, or (iv) automatically at a predetermined time.

Referring again to FIG. 1, the electronic calendar 112, 122 may be implemented using an application, a routine, a program, a piece of code, a sequence of instructions, or a hardware structure incorporating the same. Examples of various such applications include a calendar, an organizer, a spreadsheet, a database, a word processor, an electronic mail application, and a time management program (e.g., implementing dockets, tasks, or schedules). Such an application may be capable of organizing and managing an electronic event, such as, for example, a goal, a status, a start time, a task, a deadline, an invitation, a schedule, and/or a reminder. An electronic event may be related to a physical occurrence, such as, for example, a meeting, an appointment, a show, an appearance, a performance, a game, or a transaction.

The storage devices 112, 122 may be implemented using an internal or external memory, such as a random access memory ("RAM") or non-volatile memory, to temporarily or permanently store the electronic calendars 112A, 122A. The storage devices 112, 122 may be fixed or removable. The storage device 112, 122 may be an entire device for storing data or a portion thereof.

Either or both of the devices 110, 120 may include an interface 225 that allows the processors 114, 124 and storage devices 112, 122 to communicate using the communications link 130. The communications link 130 may be a direct or indirect link enabling communication between the devices 110, 120, irrespective of physical separation. The communications link 130 may send and receive signals (e.g., electric, electromagnetic, and optic signals) that convey or carry data streams representing various types of digital/analog data and content. The link 130 may include a wired or a wireless communications link (e.g., trace connection within a board, cable, radio frequency, infrared, or satellite). The link 130 also may include one or more networks, such as, for example, the Internet, the World Wide Web, a wide area network ("WAN"), a local area network ("LAN"), a switched network (e.g., Public Switched Telephone Network ("PSTN"), Integrated Services Digital Network ("ISDN"), and Digital Subscriber Line ("xDSL")), a radio network, a television network, a cable network, a satellite network, and/or any other system for conveying data between intelligent devices. The link 130 also may include a variety of intermediary devices. For example, the link 130 may include a variety of additional components to support a network, such as repeaters, routers, switches, hubs, and other communications equipment. The link 130 may include a host computer.

Referring again to FIG. 2, the system 200 may be used to support a calendar application provided by a host system. As FIGS. 1 and 2 suggest, calendars and calendar applications may be provided by, for example, a host system, a network of personal computers, or a single personal computer. Further, the implementations for overlaying or importing calendars may be implemented, for example, on host-based systems, network-based systems, or single computers. Implementations include calendars and calendar applications provided over the Internet and through private networks such as that provided by America Online, Inc. The calendar application as well as the calendar may be hosted on one or more sites remote from a user's machine(s), local to a user machine(s), or some combination such as storing the calendar remotely while (i) operating the calendar application locally or (ii) operating various aspects of the calendar application locally and other aspects remotely.

The host 240, also referred to as a host system, may include one or more host devices (not shown) and/or host controllers (not shown). For example, the host 240 may include one or more general-purpose computers (e.g., personal computers), one or more special-purpose computers (e.g., devices programmed to communicate with each other and/or the devices 210, 215, 220), or a combination of one or more general-purpose computers and one or more special-purpose computers. The host 240 may be arranged to operate as part of, or in concert with, one or more other systems, such as, for example, one or more LANs and/or WANs.

A host device may be connected to a host controller by a wired or a wireless communications link. The host device may execute instructions under the command of a host controller. A host device may include one or more hardware components and/or software components. An example of a host device is a general-purpose computer (e.g., a personal computer) to respond to and to execute program or application instructions. Other examples include a special-purpose computer, a workstation, a server, or other physical or virtual equipment that may respond to and execute instructions.

An example of a host controller is a software application loaded on a host device, or one of the devices 210, 215, 220, to command and direct communications enabled by the devices 210, 215, 220 or the host device. Other examples of a host controller include a program, a piece of programming code, a processor, a computer, a computer system, or a combination thereof, that independently or collectively instructs a host device or one of the devices 210, 215, 220. A host controller may be embodied permanently or temporarily in any type of machine, component, physical or virtual equipment, storage medium, or propagated signal to provides instructions to one of the devices 210, 215, 220 or to a host device.

The three devices 210, 215, 220 of the system 200 may be similar to the devices 110, 120 of the system 100; however, the devices 210, 215, 220 need not include an electronic calendar. Nevertheless, the devices 210, 215, 220 may be capable of presenting an electronic calendar to a user.

Without reference to any particular figure, a variety of additional implementations are described for accessing and selecting event information. One or more electronic events or event information associated with an electronic calendar owned by a second party may be identified as a candidate to be accessed and presented. The identification can occur in a variety of ways. A user, such as a person or a device, can search for event information (e.g., using a search tool/application, such as a browser) or connect to event information (e.g., using a hyperlink). Searching may be done using content on a network, such as a web page on the Internet, in a published calendar, or in a database of published electronic events. Connecting to event information may be performed by, for example, using a hypertext link or entering a Uniform Resource Locator ("URL"), Internet Protocol ("IP") address, or other content source identifier. Event information also may be sent to a user using an electronic mail or an instant messaging service.

All event information or only selected event information associated with an electronic calendar may be identified as candidates for importing. User preferences also may be set when importing event information. For example, the importing calendar can supply a user-specified default time of reminder when importing associated event information.

Importing the event information may require a user, such as an owner of the calendar that is doing the importing, to perform various functions, such as, for example, selecting a hyperlink, pointing and clicking on an event or specific event information for importing, and/or entering a user ID or password.

In one implementation, the event information may be imported as a batch. Batch importing includes importing multiple event information using a single process. For example, multiple event information may be identified and then downloaded with a single command, rather than downloading each event information as it is identified for importing.

Imported event information relating to highly confidential events also may be temporarily stored to reserve time slots in a calendar without being permanently stored. Further, to preserve confidentiality of subject matter, the time slot information may be the only event information stored.

Referring again to FIG. 7, the student also may add notes or other information relating to the event information that is imported (overlaid) with the personal calendar 710. The notes or other information may be entered in the personal calendar 710. For example, the student may enter a note in the same date as the first release movie event 720A, identifying the people that will be attending the movie. This note may be independent of the event 720A, such that when the event 720A is updated the note is not changed. However, the note may instead be dependent on the event 720A, including, for example, a pointer to the event 720A, such that if the event 720A is moved or removed then the note is also moved or removed. In an overlay implementation, the electronic calendar may keep a list of the events/calendars to be overlaid and every such note may store the name of its associated event/calendar and check the list to ensure that the event/calendar is still an overlay.

All information associated with an event may be updated, or only some of the event information may be updated. For example, if only selected event information is made available for display, then only the event information associated with that event information is updated. However, some imported event information may not be updated, such as, for example, the identification number.

The event information may be periodically updated. All event information that is updated may be updated at the same time. The update may vary, for example, by event, event type, or event information. For example, each event or event type may have an individual update schedule, where events of a specific type may have a common update schedule. If the updating of event information varies by event, an event may include event information (e.g., an update field) to indicate if updates are desired and/or when such updates are desired. Update event information or an update field may indicate, for example, the day of the month, the day of the week, or the time of day that updates are to be implemented. The update event information allows some events to be updated more frequently than others. The update event information also may allow an update to be performed at a time when a network or a computer is idle or underused. Such update information also may apply, as indicated earlier, to multiple events or to selected event information across multiple events.

Other event information may be used to update events and event information. Event information that indicates a last update time may be used to determine whether to update an event or selected event information relating to an event. For example, an event, or selected event information, may be configured to be updated only if the last-update event information indicates that a certain amount of time has passed.

One way to update is to import the event or event information. Another manner of updating is to synchronize two electronic calendars to ensure that two sets of data are the same. Synchronizing may be partial or complete. For example, particular imported event information may be synchronized to match the corresponding source event information. Thus, when a selected event or event information is synchronized, event information at the source that is the most current may be used in the update.

Updating event information may be an automatic or a manual process. For example, manual updating may require a user to point and click to select a particular event and/or event information. Updating may require entry of a user ID and/or a password. The updated event information may be stored. In addition, the updated event information may be displayed.

If the updated event information is displayed with other event information that was not updated, then the updated event information may be identified to alert the viewer to the update. If only a portion of the updated event information was modified by an update, then the modified event information may be identified. The updated/modified event information may be identified by, for example, visually altering the appearance of the information, such as, for example, using a different font type, font size, color, bolding, underlining, italicizing, or blinking. Other ways of identifying updated modified data include using a pointer or flag, printing the information, displaying the information using an additional window, using an electronic mail or instant message, or using an audio message or alert.

A variety of additional implementations are also available. For example, the process 600 can be implemented by a single device including an electronic calendar and event information to be imported into the electronic calendar, or by either of the systems 100, 200.

The recited elements of the processes 300, 600 may be performed in a different order than that described above, and elements may be added or deleted as warranted by a particular application. Various elements described in the context of one implementation may be used with other implementations.

Elements in the figures that are described as being analogous to other elements do not need to be identical and may vary in significant respects.

A number of implementations have thus been described. Nevertheless, it is understood that various modifications may be made. For example, the features described may be embodied in a process, a device, a combination of devices employing a process, circuitry operable to perform a process, or in a medium embodying instructions to control a processor for such a process. Circuitry may include, for example, a storage device or a processor. The medium may be, for example, a storage device (described earlier) or electric, optic, or electromagnetic waves that encode and/or transmit the instructions. Accordingly, other implementations are within the scope of the following claims.

What is claimed is:

1. A method of implementing an electronic calendar, the method comprising:

identifying a first party associated with a first electronic calendar owned by the first party;

identifying multiple electronic calendars that are published by parties other than the first party and that are available to be referenced by the first electronic calendar owned by the first party;

presenting, to the first party, a list of the identified multiple electronic calendars that are published by parties other than the first party and that are available to be referenced by the first electronic calendar owned by the first party;

receiving, from the first party, a selection of one or more of the identified multiple electronic calendars presented in the list to be referenced by the first electronic calendar owned by the first party, including receiving, from the first party, a selection of a second electronic calendar published by a second party that is different than the first party and a selection of a third electronic calendar published by a third party that is different than the first party and the second party;

storing, in association with the first electronic calendar owned by the first party, reference information that references the one or more electronic calendars selected by the first party;

generating a calendar view of the first electronic calendar owned by the first party by:

accessing calendar information hosted by the first electronic calendar owned by the first party, accessing the reference information that references the one or more electronic calendars selected by the first party, based on the reference information, accessing calendar information for each of the one or more electronic calendars selected by the first party and published by parties other than the first party, and generating the calendar view of the first electronic calendar using the accessed calendar information hosted by the first electronic calendar owned by the first party and the accessed calendar information for each of the one or more electronic calendars selected by the first party and published by parties other than the first party; and presenting the generated calendar view; and in response to the second party updating one or more entries in the second electronic calendar published by the second party, automatically, without human intervention, updating the calendar view of the first electronic calendar based on the one or more updated entries of the second electronic calendar published by the second party, the updated calendar view visually distinguishing the one or more updated entries from entries in the calendar view that have not been updated.

2. The method of claim 1 further comprising updating the calendar view to reflect a change made to the calendar information for at least one of the one or more electronic calendars selected by the first party and published by parties other than the first party.

3. The method of claim 2 wherein updating the calendar view comprises updating the calendar view after determining that the calendar information for the at least one of the one or more electronic calendars used in generating the calendar view differs from calendar information currently being published for the at least one of the one or more electronic calendars.

4. The method of claim 2 wherein updating the calendar view comprises updating the calendar view automatically based on a triggering event.

5. The method of claim 1 wherein the triggering event includes determining that a predetermined amount of time has passed.

6. The method of claim 1 further comprising updating the calendar view to remove event information that has been deleted from the calendar information for the one or more electronic calendars selected by the first party and published by parties other than the first party.

7. The method of claim 1 further comprising updating the calendar view to reflect a change made to the calendar information hosted by the first electronic calendar.

8. The method of claim 7 wherein updating the calendar view to reflect a change made to the calendar information hosted by the first electronic calendar comprises updating the calendar view to reflect a change made to event information hosted by the first electronic calendar.

9. The method of claim 1 further comprising updating the calendar information hosted by the first electronic calendar to include a portion of the accessed calendar information for each of the one or more electronic calendars selected by the first party and published by parties other than the first party as calendar information hosted by the first electronic calendar such that that first party assumes ownership of the portion of the accessed calendar information.

10. The method of claim 9 wherein the portion of the accessed calendar information is included in the generated calendar view even if the first party chooses to dereference each of the one or more electronic calendars published by parties other than the first party from the first electronic calendar.

11. The method of claim 9 wherein the portion of the accessed calendar information is included in the generated calendar view even if the portion of the accessed calendar information is no longer published.

12. The method of claim 1 further comprising maintaining electronic source information for the accessed calendar information hosted by the first electronic calendar owned by the first party and the accessed calendar information for each of the one or more electronic calendars selected by the first party and published by parties other than the first party.

13. The method of claim 12 wherein maintaining electronic source information comprises maintaining a first source attribute for the calendar information hosted by the first electronic calendar and one or more source attributes identifying a source for portions of the accessed calendar information corresponding to each of the one or more electronic calendars selected by the first party and published by parties other than the first party.

14. The method of claim 13 wherein maintaining the one or more source attributes comprises storing a user ID for each of the parties other than the first party.

15. The method of claim 12 further comprising presenting at least part of the source information in the calendar view.

16. The method of claim 15 wherein presenting at least part of the source information in the calendar view comprises:

presenting the accessed calendar information hosted by the first electronic calendar owned by the first party differently than the accessed calendar information for each of the one or more electronic calendars selected by the first party and published by parties other than the first party; and providing an indication of a source for the accessed calendar information for each of the one or more electronic calendars selected by the first party and published by parties other than the first party.

17. The method of claim 1 further comprising copying the accessed calendar information for each of the one or more electronic calendars selected by the first party and published by parties other than the first party and maintaining the calendar information hosted by the first electronic calendar owned by the first party and the copy of the calendar information for each of the one or more electronic calendars selected by the first party and published by parties other than the first party in separate files.

18. The method of claim 17 wherein accessing calendar information for each of the one or more electronic calendars selected by the first party and published by parties other than the first party includes accessing the copy of the calendar information for each of the one or more electronic calendars selected by the first party and published by parties other than the first party.

19. The method of claim 17 further comprising updating the copy of the calendar information for each of the one or more electronic calendars selected by the first party and published by parties other than the first party.

20. The method of claim 19 wherein updating the copy of the calendar information for each of the one or more electronic calendars selected by the first party and published by parties other than the first party comprises updating the copy after determining that the copy differs from calendar information currently published for each of the one or more electronic calendars selected by the first party and published by parties other than the first party.

21. The method of claim 19 wherein updating the copy of the calendar information for each of the one or more electronic calendars selected by the first party and published by parties other than the first party comprises updating the copy automatically based on a triggering event.

22. The method of claim 21 wherein the triggering event includes determining that a predetermined amount of time has passed.

23. The method of claim 1 wherein generating the calendar view comprises overlaying the accessed calendar information for each of the one or more electronic calendars selected by the first party and published by parties other than the first party onto a calendar view previously generated using the accessed calendar information hosted by the first electronic calendar owned by the first party.

24. The method of claim 23 wherein the generated calendar view includes event information hosted by each of the electronic calendars for a specific time period.

25. The method of claim 1 wherein accessing the calendar information for each of the one or more electronic calendars selected by the first party and published by parties other than the first party comprises accessing, for each of the one or more electronic calendars, a device operated by the party other than the first party to retrieve calendar information for the corresponding electronic calendar.

26. The method of claim 25 wherein accessing the device is performed in response to interaction between the first party and a calendar application.

27. The method of claim 1 wherein the reference information comprises an update schedule for calendar information for each of the one or more electronic calendars selected by the first party and published by parties other than the first party.

28. The method of claim 1 wherein:

accessing the calendar information hosted by the first electronic calendar comprises accessing, by an electronic calendar system, the calendar information hosted by the first electronic calendar on behalf of the first party, accessing the calendar information for each of the one or more electronic calendars selected by the first party and published by parties other than the first party comprises accessing, by the electronic calendar system, the calendar information for each of the one or more electronic calendars selected by the first party and published by parties other than the first party, the calendar information for each of the one or more electronic calendars selected by the first party and published by parties other than the first party including an entry, and the method further comprises providing, by the electronic calendar system, a reminder for the entry to the first party.

29. The method of claim 28 wherein the reminder is included in the accessed calendar information for each of the one or more electronic calendars selected by the first party and published by parties other than the first party and is set by a party other than the first party.

30. The method of claim 28 wherein an original reminder for the entry is included in the accessed calendar information for each of the one or more electronic calendars selected by the first party and published by parties other than the first party, and the method further comprises modifying, by the first party, content from the original reminder to generate the reminder that is provided to the first party.

31. The method of claim 28 wherein the reminder is set by the first party.

32. The method of claim 28 wherein the reminder is set by the electronic calendar system using a default setting associated with the first party.

33. The method of claim 1 wherein accessing the calendar information for each of the one or more electronic calendars selected by the first party and published by parties other than the first party, generating the calendar view, and presenting the generated calendar view are performed automatically in conjunction with accessing the calendar information hosted by the first electronic calendar.

34. The method of claim 1 wherein calendar information is hosted by the first electronic calendar when the first party enters the calendar information into the first electronic calendar.

35. The method of claim 1 wherein calendar information is hosted by the first electronic calendar when the first party generates the calendar information.

36. The method of claim 1 wherein event information is hosted by the first electronic calendar when the first party enters the event information into the first electronic calendar.

37. The method of claim 1 wherein event information is hosted by the first electronic calendar when the first party generates the event information.

38. The method of claim 1 wherein event information is hosted by the one or more electronic calendars selected by the first party and published by parties other than the first party when one of the parties other than the first party enters the event information into one of the one or more electronic calendars.

39. The method of claim 1 wherein event information is hosted by the one or more electronic calendars selected by the first party and published by parties other than the first party when one of the parties other than the first party generates the event information.

40. The method of claim 1 wherein accessing the calendar information for each of the one or more electronic calendars selected by the first party and published by parties other than the first party includes accessing the calendar information from a location remote from a location where the generated calendar view is being presented while the generated calendar view is being presented.

41. The method of claim 1 wherein accessing the calendar information for each of the one or more electronic calendars selected by the first party and published by parties other than the first party includes accessing the calendar information from a location remote from a location where the generated calendar view is being presented.

42. The method of claim 41 further comprising storing the accessed calendar information for each of the one or more electronic calendars selected by the first party and published by parties other than the first party as a local version in memory situated in a location local to the location where the generated calendar view is being presented.

43. The method of claim 42 wherein generating the calendar view includes, if a local version of the calendar information for each of the one or more electronic calendars selected by the first party and published by parties other than the first party is available, generating the calendar view using the local version instead of accessing the calendar information for each of the one or more electronic calendars from a location remote from a location where the generated calendar view is being presented.

44. The method of claim 1 wherein:

receiving, from the first party, a selection of one or more of the identified multiple electronic calendars presented in the list to be referenced by the first electronic calendar owned by the first party includes receiving, from the first party, a selection of a second electronic calendar published by a second party that is different than the first party and a selection of a third electronic calendar published by a third party that is different than the first party and the second party.

45. The method of claim 44 further comprising receiving, from the first party, a selection of a subset of calendar entries included in the third electronic calendar, wherein:

storing, in association with the first electronic calendar owned by the first party, reference information that references the one or more electronic calendars selected by the first party includes storing a reference to the second electronic calendar and storing a reference to the third electronic calendar along with information identifying the subset of calendar entries included in the third electronic calendar and selected by the first party;

accessing calendar information for each of the one or more electronic calendars selected by the first party and published by parties other than the first party includes accessing calendar entries in the second electronic calendar using the reference to the second electronic calendar and accessing the subset of calendar entries included in the third electronic calendar selected by the first party using the reference to the third electronic calendar and the information identifying the subset of calendar entries;

generating the calendar view includes generating a calendar view that includes the calendar entries in the second electronic calendar and, for the third electronic calendar, only the subset of calendar entries included in the third electronic calendar and selected by the first party.

46. The method of claim 44 wherein:

storing, in association with the first electronic calendar owned by the first party, reference information that references the one or more electronic calendars selected by the first party includes storing a first address for accessing the second electronic calendar over a network and storing a second address for accessing the third electronic calendar over the network; and accessing calendar information for each of the one or more electronic calendars selected by the first party and published by parties other than the first party includes accessing calendar information for the second electronic calendar over the network using the first address and accessing calendar information for the third electronic calendar over the network using the second address.

47. The method of claim 46 wherein:

the second electronic calendar is made available, by the second party, over the Internet to any user able to access content over the Internet; and storing the first address for accessing the second electronic calendar over the network includes storing a website address for accessing the second electronic calendar over the Internet.

48. The method of claim 1 wherein:

the one or more updated entries of the second electronic calendar include a modified calendar entry that has been modified by the second party;

updating the calendar view of the first electronic calendar includes:

automatically, without human intervention, identifying a calendar entry in the calendar view that corresponds to the modified calendar entry;

automatically, without human intervention, modifying the identified calendar entry in the calendar view in a manner corresponding to the modified calendar entry in the second electronic calendar; and automatically, without human intervention, visually distinguishing the modified calendar entry in the calendar view from entries in the calendar view that have not been modified.

49. A method of implementing an electronic calendar, the method comprising:

receiving, from a first user, one or more calendar events to include in a first electronic calendar associated with the first user;

receiving, from the first user, a selection of at least a portion of a second electronic calendar to be referenced by the first electronic calendar, the second electronic calendar being made available, over a network, by an entity other than the first user;

based on the selection, accessing a published event included in the second electronic calendar;

importing the published event in a view of the first electronic calendar with the one or more calendar events received from the first user;

receiving, from the first user, dependent calendar information to associate with the published event accessed from the second electronic calendar;

associating, in the first electronic calendar, the dependent calendar information with the published event;

subsequent to associating, in the first electronic calendar, the dependent calendar information with the published event, accessing updated calendar information for the second electronic calendar, the updated calendar information indicating that the published event has been updated by the entity other than the first user; and in response to accessing the updated calendar information for the second electronic calendar:

automatically, without human intervention, updating the published event in the view of the first electronic calendar based on the updated calendar information for the second electronic calendar;

automatically, without human intervention, identifying the dependent calendar information as being associated with the published event in the first electronic calendar, automatically, without human intervention, updating the dependent calendar information in a manner corresponding to the update to the published event, and automatically, without human intervention, presenting the view of the first electronic calendar based on the update to the published event and the update to the dependent calendar information.

50. The method of claim 49 wherein:

automatically, without human intervention, updating the published event in the view of the first electronic calendar includes moving the published event in the view of the first electronic calendar; and automatically, without human intervention, updating the dependent calendar information in a manner corresponding to the update to the published event includes moving the dependent calendar information in manner corresponding to the movement of the published event.

51. The method of claim 49 wherein:

automatically, without human intervention, updating the published event in the view of the first electronic calendar includes deleting the published event from the view of the first electronic calendar; and automatically, without human intervention, updating the dependent calendar information in a manner corresponding to the update to the published event includes deleting the dependent calendar information based on the published event being deleted.

52. The method of claim 49 wherein receiving, from the first user, dependent calendar information to associate with the published event accessed from the second electronic calendar includes receiving, from the first user, a note to associate with the published event accessed from the second electronic calendar.

53. The method of claim 49 wherein:

associating, in the first electronic calendar, the dependent calendar information with the published event includes storing identifying information for the published event in association with the dependent calendar information; and automatically, without human intervention, identifying the dependent calendar information as being associated with the published event in the first electronic calendar includes, identifying the dependent calendar information as being associated with the published event in the first electronic calendar based on the identifying information for the published event stored in association with the dependent calendar information.

54. The method of claim 53 wherein storing identifying information for the published event in association with the dependent calendar information includes storing a name of the published event in association with the dependent calendar information.

55. The method of claim 49 wherein automatically, without human intervention, updating the published event in the view of the first electronic calendar based on the updated calendar information for the second electronic calendar comprises, when the updated published event is displayed with other events that have not been updated, identifying the updated published event in a manner that alerts the first user to the update of the published event.

56. The method of claim 49 further comprising:

comparing a digital signature of stored event information for the second electronic calendar that has been imported into the view of the first electronic calendar to a digital signature of modified event information for the second electronic calendar that is being made available, over the network, by the entity other than the first user; and determining that it is necessary to update the view of the first electronic calendar based on the comparison;

wherein accessing updated calendar information for the second electronic calendar comprises accessing updated calendar information for the second electronic calendar occurs in response to the determination that it is necessary to update the view of the first electronic calendar.

* * * * *